United States Patent [19]
Leedom

[11] 3,952,147
[45] Apr. 20, 1976

[54] PICKUP ARM CARTRIDGE

[75] Inventor: Marvin Allan Leedom, South Brunswick Township, Middlesex County, N.J.

[73] Assignee: RCA Corporation, New York, N.Y.

[22] Filed: Nov. 12, 1974

[21] Appl. No.: 522,815

[52] U.S. Cl............................ 178/6.6 R; 274/23 A
[51] Int. Cl.².................. G11B 25/04; G11B 25/06; H04M 1/64; G11B 3/20
[58] Field of Search........ 178/6.6 R, 6.6 A, 6.6 DD; 179/100.4 R; 274/23 R, 9 RA, 23 A

[56] References Cited
UNITED STATES PATENTS

| | | | |
|---|---|---|---|
| 3,661,397 | 5/1972 | Worth et al........................ | 274/23 A |
| 3,873,783 | 3/1975 | Leedom............................ | 274/23 R |

Primary Examiner—Vincent P. Canney
Attorney, Agent, or Firm—Eugene M. Whitacre; William H. Meagher; Dilip A. Kulkarni

[57] ABSTRACT

A pickup arm cartridge houses a fragile signal pickup assembly of a video disc record player to (1) protect the signal pickup assembly during storage and handling, and (2) facilitate replacement of the signal pickup assembly without any critical manual adjustments or connections. A signal pickup assembly comprises a pickup arm carrying a signal pickup at one end and having its remote end secured to a coupler by a compliant pickup arm support. The coupler is suspended in the pickup arm cartridge such that the suspension, while permitting translatory motion of the coupler, (1) maintains angular orientation of the pickup in signal transfer relation with a disc record, and (2) positions the coupler for engagement with a translatory motion imparting transducer of the player supporting structure when the cartridge is assembled in the player. A leaf spring securely holds the signal pickup assembly in the cartridge during storage and handling. Means are provided for disabling the leaf spring during playback thereby disposing the signal pickup subject to engagement with the disc record.

10 Claims, 5 Drawing Figures

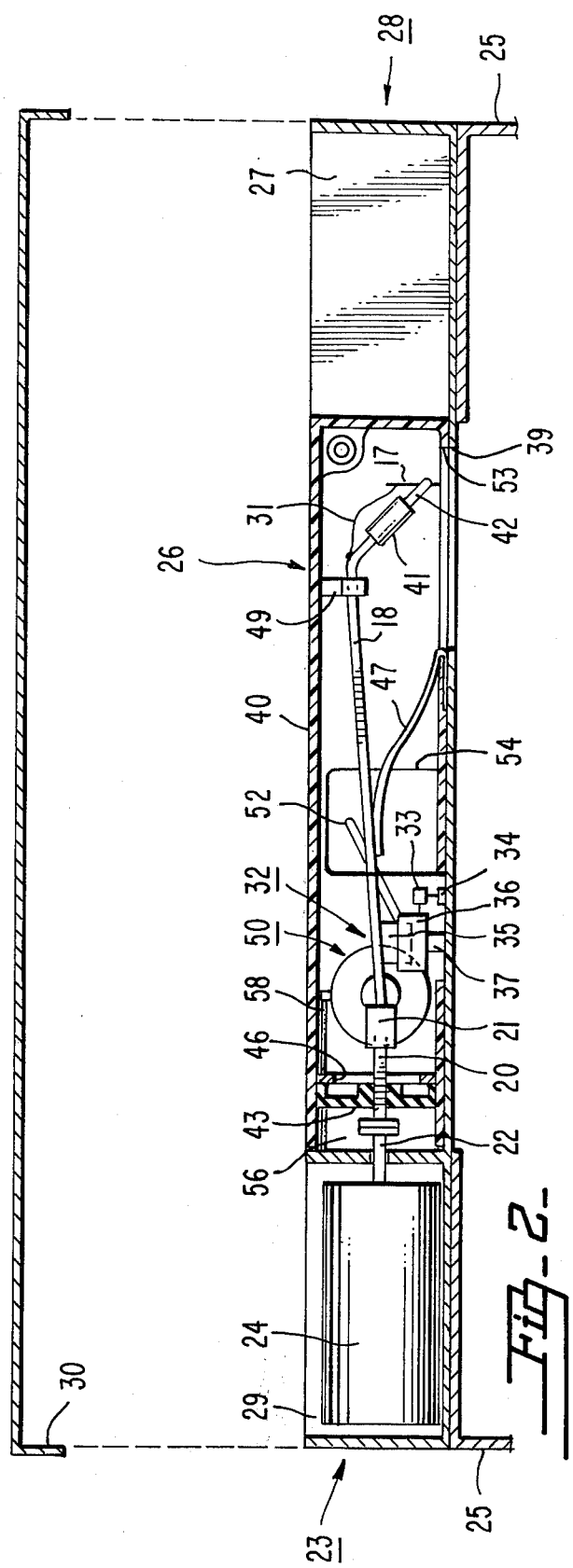
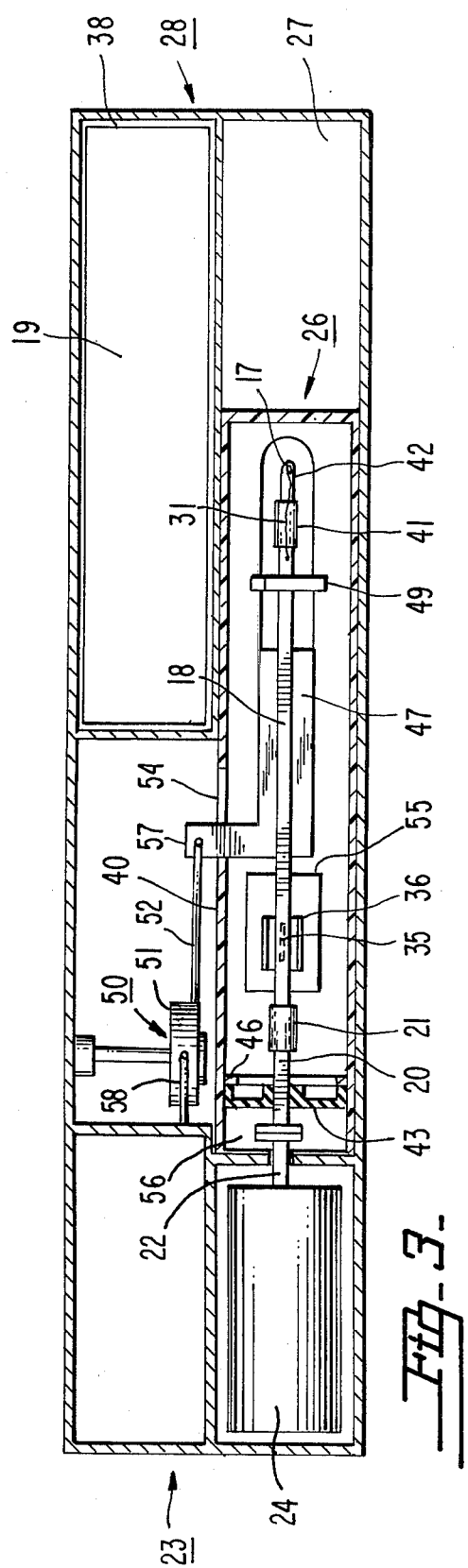

PICKUP ARM CARTRIDGE

BACKGROUND OF THE INVENTION

The present invention relates to a cartridge housing a delicate signal pickup assembly of a video disc record playback system in order to (1) protect the fragile signal pickup during storage and handling, and (2) facilitate a facile assembly of a pickup arm carrying the signal pickup to a supporting structure of the player, whereby unskilled and quick consumer replacement becomes practical.

PICKUP ARM CARTRIDGE

In certain video disc systems video information is recorded by means of geometric variations in the bottom of a smooth spiral groove on the surface of a disc record. The disc record surface includes a coating of conductive material which is preferably covered with a thin deposit of dielectric material. A signal pickup engages the spiral groove and includes a conductive electrode which establishes a capacitance with the conductive coating and the dielectric deposit of the disc record. When the disc record is rotated, the electrode-disc capacitance varies in response to the geometric variations in the bottom of the spiral groove passing beneath the pickup. The capacitance variations are converted to electrical signal variations by suitable signal processing circuitry. The output signal of the signal processing circuitry may be coupled to a conventional television receiver for reproduction. The other end of the pickup arm is flexibly mounted to a coupler carried by a support member of a supporting structure of the playback system. A system of the aforementioned type is described in detail in U.S. Pat. No. 3,842,194, issued on Oct. 15, 1974 to J. K. Clemens.

Video disc systems of the above-described type generally utilize disc records having groove densities in the order of 4 to 8,000 groove convolutions per inch. A typical video disc record of this type may therefore have a groove convolution spacing in the order of 3.5 microns. The signal pickup groove-engaging requirement and relatively narrow groove convolution spacing lead to the delicate dimensions of the signal pickup (e.g., signal pickup stylus width 2 microns, depth 5 microns). Additionally, the signal pickup electrode must be narrow enough in the direction of the spiral groove to be sensitive to the modulations recorded in the groove bottom (e.g., electrode depth of 0.2 microns). Further, it is desirable to provide a low mass signal pickup assembly including the pickup arm which is capable of effectively following, (1) relatively high frequency cyclical (e.g., at and above once-around frequency of 7.5 cps at disc record rotational speed of 450 rpm) longitudinal motion imparted to it by the translatory motion imparting means, and (2) the vertical and lateral motion imparted to it by the groove-engaging signal pickup due to the disc record warpage and eccentricity. The above-recited groove-engaging and low mass requirements result in a signal pickup assembly which is very fragile. Pursuant to the principles of the present invention, the video disc player's pickup arm is housed in a cartridge which will protect the fragile signal pickup assembly during storage and handling.

In video disc systems of the aforementioned Clemens type it has been recognized that the relative motion between the disc record and the signal pickup must be maintained at a predetermined speed, within specified tolerance limits (e.g., 450 rpm, ±0.01 percent), in order to obtain high fidelity of reproduction of the prerecorded signals. The predetermined speed and the specified tolerance limits are also necessary to assure that the horizontal and vertical synchronizing information is stable and within the lockup range of the deflection circuits of the television receiver. Moreover, when the prerecorded information is a color television signal with chrominance information recorded as a modulated carrier signal, the recovered signal must be stable and within the lockup range of the color processing circuits of the playback system in order to minimize color phase distortion.

The disc record/signal pickup relative speed may be maintained at the predetermined speed within the specified tolerance limits by rendering the support member, carrying the signal pickup assembly, subject to cyclical, translatory motion along the longitudinal axis of the pickup arm in a manner that opposes the deviations of the instantaneous relative speed from the predetermined speed. Illustratively, the means for imparting translatory motion to the support member may be of the type disclosed in the U.S. Pat. No. 3,711,641, issued to R. C. Palmer on Jan. 16, 1973, entitled "Velocity Adjusting System". Pursuant to an advantageous aspect of the present invention, a pickup arm cartridge is provided which facilitates replacement of the pick-up arm without requiring manual dexterity in effecting the requisite connection between the pickup arm and the translatory support member.

In video disc systems of the type described above, it is desirable for accurate reproduction of prerecorded signals that the electrode included in the signal pickup maintain a precise and substantially constant orientation in the spiral groove. Use of a pickup arm cartridge embodying the present invention facilitates replacement of the signal pickup without any critical, manual orientation adjustments. Also, through use of a pickup arm cartridge embodying the present invention signal pickup replacement may be effected without need for rewiring of the circuitry coupled to the signal pickup electrode.

SUMMARY OF THE INVENTION

A pickup arm cartridge houses a delicate signal pickup assembly of a disc record player. The signal pickup assembly includes a pickup arm carrying a signal pickup at one end thereof and having its remote end secured to a coupler by a compliant pickup arm support. The coupler is subject to engagement with translatory motion imparting means of a supporting structure of the player for varying the position of the signal pickup in relation to a disc record in a manner that opposes deviations of the disc record/signal pickup relative speed from a predetermined speed. The coupler is suspended in a pickup arm cartridge protective casing such that the suspension while permitting translatory motion of the coupler, (1) maintains angular orientation of the pickup in signal transfer relation with the disc record, and (2) positions the coupler for easy engagement with the translatory motion imparting means when the cartridge is assembled in the player. Biasing means securely hold the signal pickup assembly in the casing during storage and handling of the cartridge. Means are provided for disabling the biasing means during playback thereby disposing the signal pickup subject to engagement with the disc record.

BRIEF DESCRIPTION OF THE DRAWINGS

Other objects, features, and advantages of the present invention will be more fully understood from the following detailed description of the preferred embodiment, the appended claims and accompanying drawings, in which:

FIGS. 2 and 3 are, respectively, partially sectioned side view and top view of the pickup arm cartridge of FIG. 1;

DETAILED DESCRIPTION OF THE PREFERRED EMBODIMENT

Figure 1:
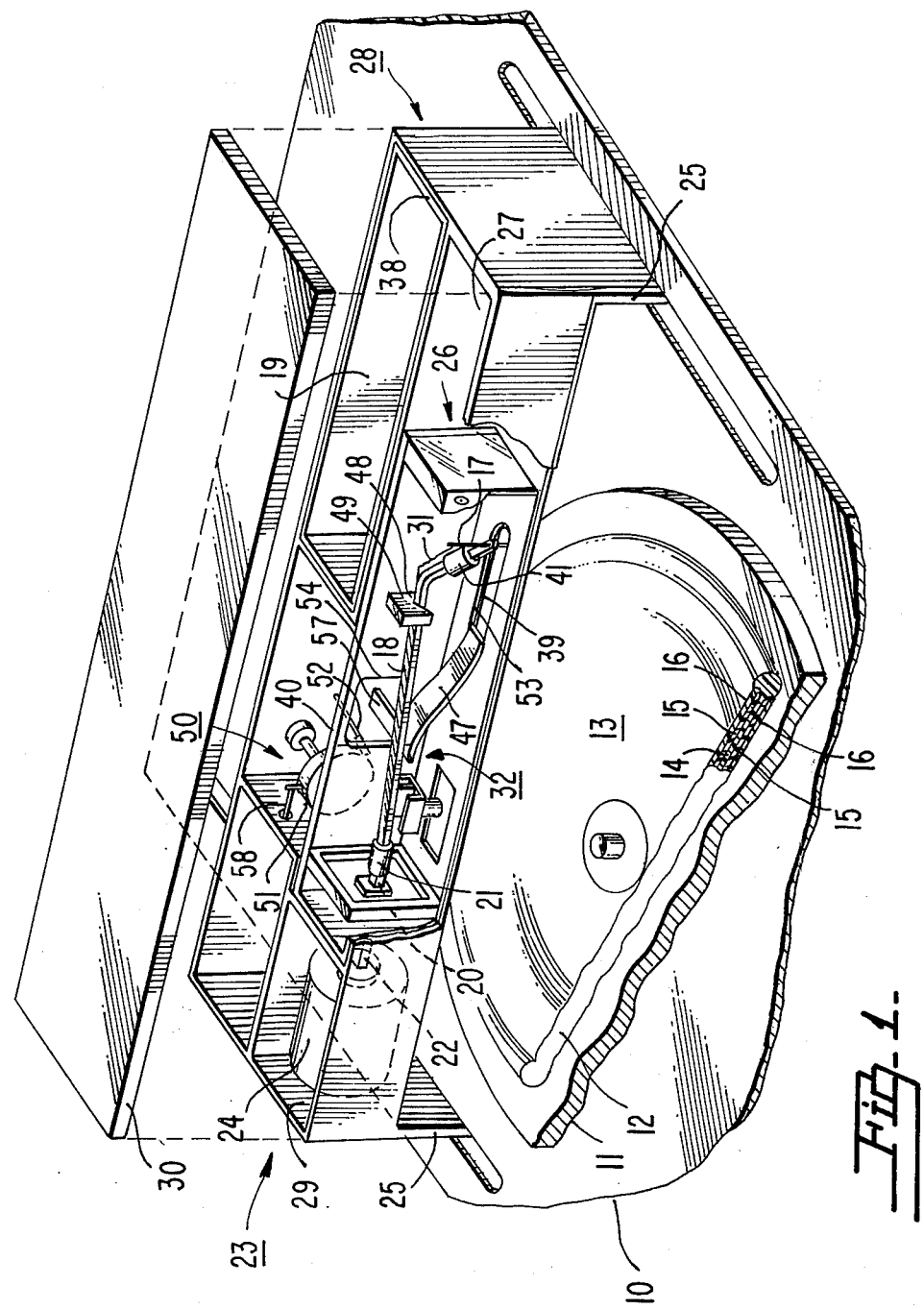
FIG. 1 is a partially cut-away perspective view of a video disc player incorporating an embodiment of the present invention and illustrating a pickup arm cartridge installed in a supporting structure of the player.

Referring to the drawings, wherein like reference numerals designate similar elements in the various views, in FIG. 1 a video disc record player is shown having a turntable mounting plate 10. The player is suitable for use in a video disc system such as disclosed in the aforementioned Clemens' application (U.S. Pat. application, Ser. No. 126,772). A turntable 11 is rotatably mounted on the turntable mounting plate 10. The upper surface of the turntable 11 is adapted to support a video disc record 12. Video information is recorded by means of geometrical variations in the bottom of a smooth spiral groove 13 on the substrate 14 of the disc 12. The disc 12 surface includes a conductive coating 15 which is covered with a thin deposit 16 of dielectric material. A signal pickup 17, supported by a pickup arm 18, engages the spiral groove 13 and includes a conductive electrode (not shown) which, together with the conductive coating 15 and the dielectric deposit 16, form a capacitor. When relative motion is established between the signal pickup 17 and the disc record 12, an edge of the electrode included in the signal pickup, while riding in the spiral groove 13, serves as an electrode of a capacitor varying due to the geometric variations in the bottom of a smooth spiral groove passing beneath. The other end of the pickup arm 18 is flexibly secured to a coupler 20 by a compliant pickup arm support 21 which is made of insulating material. The coupler 20 is subject to engagement with a support member 22 (shown in FIG. 2) carried by supporting structure 23.

The supporting structure 23 comprises a translatory motion imparting means 24 mounted on a radial feed drive mechanism 25 (not shown). The radial feed drive mechanism 25 causes the translatory motion imparting means 24, carrying the signal pickup assembly, to travel radially inward towards the center of rotation of the disc 12 during playback. The radial motion of the pickup arm assembly provides approximate lateral tracking of the signal pickup 17 in the spiral groove 13 in proper time relationship with the rotation of the disc record 12. In video disc systems of the aforementioned type, the fragile walls of relatively narrow grooves of the disc record (e.g., groove convolution spacing 3.5 microns) cannot be dependably relied upon to pull the pickup arm assembly around the pivot support across the entire recorded surface of the disc record. Also in video disc systems utilizing variable capacitor concept, it is desirable for accurate reproduction of prerecorded signals that the electrode included in the signal pickup 17 maintain a substantially constant orientation in the spiral groove 13. The radial feed drive mechanism 25 satisfies the above requirements by traversing the supported end of the pickup arm 18 in proper time relationship with the radial motion of the signal pickup end engaged in the spiral groove 13 so as to continuously maintain the longitudinal axis of the pickup arm substantially tangential to the spiral groove at the point of engagement. Reference may be made to the copending U.S. Pat. application of F. R. Stave, Ser. No. 351,600, filed Apr. 16, 1973, and entitled "Video Disc Playback Apparatus" for an illustration of a suitable radial feed drive mechanism 25 for providing the indicated radial motion.

Illustratively, the translatory motion imparting means 24 may be of the type disclosed in the U.S. Pat. No. 3,711,641, issued to R. C. Palmer on Jan. 16, 1973, entitled "Velocity Adjusting System." In the Palmer system the deviations of the disc record/signal pickup relative velocity from a predetermined velocity are corrected by rendering the support member 22 carrying the coupler 20 of the signal pickup assembly subject to cyclical, translatory motion along the longitudinal axis of the pickup arm in a manner that opposes the deviations.

A pickup arm cartridge 26, which houses the signal pickup assembly in the manner to be described subsequently, is received in a compartment 27 of a housing comprising a box-like conductive cage 28, which is mounted on the radial feed drive mechanism 25. The translatory motion imparting means is enclosed in a compartment 29 provided in the box-like cage 28. The cage 28 is reciprocally supported at both ends thereof in order to provide a more rigid construction for the disc record player. A lid 30 is shown disengaged from the cage 28 in order to illustrate the details underneath.

Reference is now made to FIGS. 2 and 3 illustrating, respectively, the side view and the top view of the pickup arm cartridge 26 of FIG. 1. A conductive portion of the pickup arm 18, which is electrically connected to the signal pickup 17 electrode by a fly-lead 31, forms a transmission line with the conductive cage 28, the conductive portion of the arm effectively serving as an inner conductor of the transmission line and the surrounding conductive cage serving as an effectively grounded outer conductor. The transmission line is capacity end loaded at both ends: (a) at the signal pickup end by a variable capacitance established between the signal pickup 17 electrode and the disc record conductive coating 15, and the larger capacitance exhibited between the bottom of the conductive cage 28 and the disc record conductive coating in the area overshadowed by the cage; and (b) at the coupler end by a series combination of an air dielectric capacitor 32, a voltage variable capacitor 33 (FIG. 2), and a disc capacitor 34 (FIG. 2). The air dielectric capacitor has a first plate 35 suspended from the pickup arm 18, and a pair of plates 36 fixedly mounted to the cage 28 by an insulator post 37 and interleaved with the first plate 35. The transmission line and associated capacitance form a tuned circuit with a resonant frequency subject to variation as the signal pickup electrode/disc record conductive coating capacitance varies. The tuned circuit is excited with UHF oscillations from a fixed frequency oscillator of the signal processing circuitry 19 operating at a frequency within an ISM-allocated band. As the resonant frequency of the tuned circuit varies, the resultant UHF oscillation amplitude variations are detected to recover the prerecorded information. The signal processing circuitry 19, including the fixed frequency oscillator and the detector, are enclosed in a compartment 38 of the conductive cage 28. Where inductive coupling to the tranmission line resonant circuit is relied upon, suitable coupling loops with leads therefor extending through openings in the compartment wall may be provided. An opening 39 is provided in the bottom wall of the conductive cage 28 to permit the signal pickup 17 to pass through for engagement with the disc record 12 for playback. Reference may be made to the copending U.S. Pat. application of D. J. Carlson et al., Ser. No. 451,103, filed Mar. 14, 1974, and entitled "PICKUP APPARATUS FOR VIDEO DISC PLAYERS" for a detailed discussion of a suitable arrangement for the aforesaid transmission line, resonant circuit, coupling loops, and associated signal processing circuitry.

Figure 4:
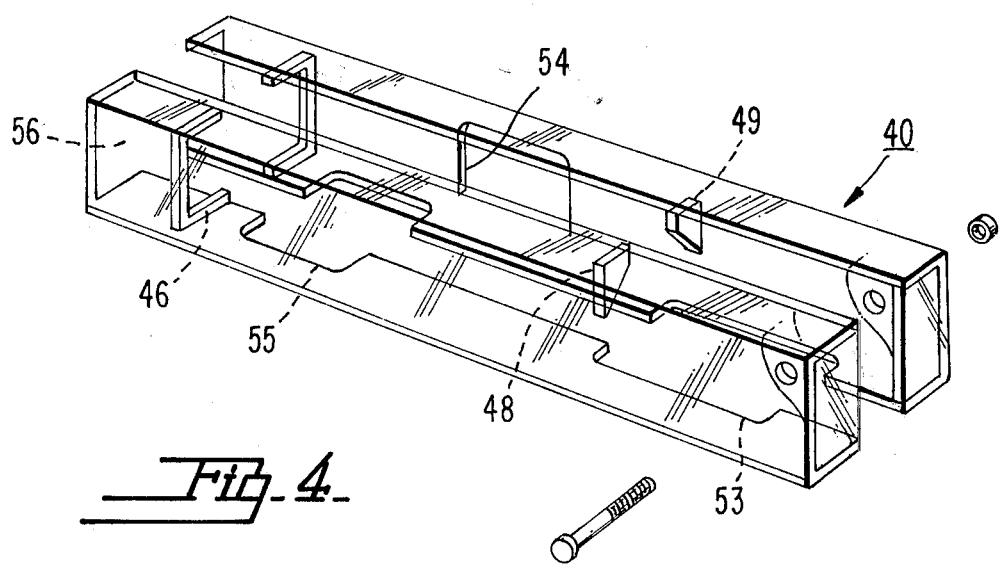
FIG. 4 illustrates exploded, perspective view of a pickup arm cartridge protective casing.

The pickup arm cartridge 26 includes a protective casing 40. In the preferred embodiment the casing 40 is made of material, such as plastic, readily permitting the desired couplings of UHF energy between the signal processing circuitry 19 and the transmission line element provided within the casing 40 by conductive pickup arm 18. For purposes of manufacturing convenience, the casing 40 may be made of two halves which are joined together by suitable fastening means as shown in FIG. 4.

As above indicated, the signal pickup assembly includes a pickup arm 18 carrying a signal pickup 17 at one end and having its remote end secured to a coupler 20 by a compliant pickup arm support 21. The coupler 20 is subject to engagement with the support member 22 of the translatory motion imparting means 24 for varying the position of the signal pickup 17 in relation to the disc record spiral groove 13 in a manner that opposes deviations of the spiral groove/signal pickup relative speed from the predetermined speed. The compliant pickup arm support 21 rigidly transmits the translatory motion of the coupler 20 to the pickup arm 18 while permitting arcuate movement of the pickup arm about the support, (1) to bring the signal pickup 17 into and out of playback position with the disc record 12, and (2) to accommodate during playback vertical and lateral motion of the signal pickup in the disc record groove 13 due to disc record warpage and eccentricity. The compliant pickup arm support is made of insulating material in the preferred embodiment.

Another compliant signal pickup support 41 is interposed between a signal pickup holder 42, holding the signal pickup 17, and the pickup arm 18. The compliant signal pickup support 41, positioned adjacent to the signal pickup 17, facilitates reduction of the signal pickup assembly mass which must follow vertical and lateral motion of the signal pickup in the disc record spiral groove 13, thereby reducing the mechanical impedance presented by the signal pickup to the fragile walls of the spiral groove.

Means 43 are used to suspend the coupler 20 in the protective casing 40. The suspension means 43, while permitting the translatory motion of the coupler 20 subject to engagement with the support member 22 of the translatory motion imparting means 24, (1) maintains angular orientation of the pickup electrode in signal transfer relation with the disc record spiral groove 13, and (2) positions the coupler for easy engagement with the support member, when the pickup arm cartridge is assembled in the cage compartment 27.

Figure 5:
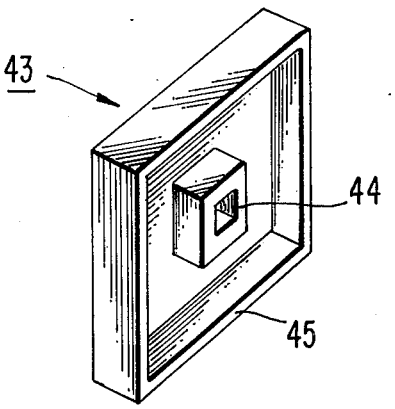
FIG. 5 illustrates an elastic suspension means for suspending a coupler carrying the pickup arm in the protective casing of FIG. 4.

In the illustrative embodiment, the suspension means 43 is a rectangular diaphragm made of elastic material, such as rubber. Now referring to FIG. 5, the diaphragm has an aperture 44 through which the coupler 20 is inserted. Both the diaphragm aperture 44 and the coupler 20 are rectangular in cross section in the preferred embodiment in order to facilitate orientation of the coupler in relation to the diaphragm 45. The coupler 20 is securely fastened to the diaphragm 43 by any suitable means, such as gluing. The diaphragm 43 has a rectangular rim portion 45 which is seated in the protective casing 40 as shown in FIGS. 2 and 3. A collar 46 is provided in the protective casing 40 in order to properly locate the diaphragm 43, carrying the coupler 20. The diaphragm 45 is secured to the protective casing 40 by any suitable means, for example, press fitting. The diaphragm 43 facilitates orientation of the pickup 17 electrode in signal transfer relation with the disc record spiral groove 13 during playback when the pickup arm cartridge 26 is assembled in the cage compartment 27.

Reference is again made to FIGS. 2 and 3. In the preferred embodiment, in order to facilitate automatic engagement of the coupler 20 with the support member 22, the coupler is made of magnetic material, such as steel, and the support member includes a permanent magnet. The geometry of the cage compartment 27 and the pickup arm cartridge 26 is such that when the cartridge is properly assembled in the compartment the support member 22 and the coupler 20 automatically engage due to magnetic force of attraction. Any other suitable arrangement may be used instead of magnetic coupling employed in the preferred embodiment.

Biasing means 47 securely hold the signal pickup assembly during storage and handling of the cartridge 26 by urging the pickup arm 18 against an inverted V-shaped recess 48 disposed in a centering rest 49 depending downwardly from the top wall of the protective casing 40. In the preferred embodiment the biasing means 47 is a leaf spring having one end secured to the protective casing 40 and second end subject to engagement with the pickup arm 18 during storage and handling of the cartridge 26. The inverted V-shaped recess 48 serves to center the pickup arm 18 in the protective casing 40, and it prevents lateral shifting of the pickup arm during handling of the cartridge.

Means 50 are provided for disabling biasing means during playback thereby disposing the signal pickup 17 subject to engagement with the disc record spiral groove 13. In the preferred embodiment the disabling means 50 comprises a roller 51 rotatably mounted to the supporting structure cage 28 adjacent the leaf spring 47 second end. A finger 52, subject to engagement with an extension 57 of the leaf spring 47, is mounted on the roller 51 for movement between (1) a first position to allow the leaf spring to securely hold the pickup arm 18 against the inverted V-shaped recess 48 of the centering rest 49, and (2) a second position to cause the leaf spring to disengage from the pickup arm so as to dispose the signal pickup 17 subject to engagement with the disc record spiral groove 13. Means (not shown) are provided to bias the finger 52 in the first position. Actuating means 58 are provided to selectively cause rotation of the roller 51 so as to dispose the finger 52 in the second position. The advantage of biasing the finger 52 in the first position is that in case of accidental inactivation of the actuating means 58 (for example, due to power failure) the pickup arm 18 will be raised by the leaf spring 47 thereby automatically disengaging the signal pickup 17 from the disc record spring groove 13.

It will be noted that during movement of finger 52 to its second position, so as to effect set-down of the signal pickup on a record, the pickup arm 18 rests on a smooth upper surface of leaf spring 47. In the instance (undesired, but possible) of a lateral, decentering bias in coupler 21, the smooth supporting surface of the spring permits a lateral sliding of the pickup arm 18, in response to the undesired bias, to occur prior to release of the pickup arm. This avoids the possibility of record surface scratching that may accompany postponement of arm response to the bias until after pickup arm release.

The protective casing 40 is provided with a plurality of openings for passage of respective operating elements of the disc record player when the cartridge 28 is assembled in the player supporting structure compartment 27. Illustratively, openings 53, 54, 55 and 56 are provided, respectively, for permitting (1) the signal pickup 17 to pass through for engaging the disc record 12, (2) the extension 57 of the leaf spring 50 to pass through the casing for manipulation by the disabling means finger 52, (3) the insulator post 37 carrying the capacitor plates 36 of the air dielectric capacitor 32 to enter the casing for establishing capacitance with the pickup arm 18 suspended plate 35, and (4) the support member 22 of the translatory motion imparting means 24 to enter the casing for engaging the coupler 20 carrying the pickup arm.

Thus, a pickup arm cartridge is provided for housing a fragile signal pickup assembly which (1) protects the signal pickup assembly during storage and handling of the cartridge and, (2) facilitates simple replacement of the signal pickup assembly.

What is claimed is:

1. In a playback system for recovering recorded signals from a spirally grooved disc record by a signal pickup when relative speed is established therebetween, said playback system including a supporting structure; an apparatus comprising:
 1. a pickup arm cartridge adapted for reception in a compartment provided in the supporting structure which comprises:
   A. a signal pickup assembly including:
    a pickup arm carrying said signal pickup at one end thereof;
    b. a coupler; and
    c. a compliant pickup arm support for securing an end of the pickup arm remote from the signal pickup to the coupler, the compliant pickup arm support permitting arcuate motion of the pickup arm in order to accommodate vertical and lateral motion of the signal pickup in the disc record spiral groove;
   B. an elongated casing having walls defining a protective enclosure for the signal pickup assembly;
   C. means for suspending said coupler within the casing, and wherein the casing has an opening for permitting the signal pickup to pass through for engagement with the disc record spiral groove during playback; and
   D. biasing means securely holding the signal pickup assembly in the casing during storage and handling of the cartridge; and
 2. means mounted in the supporting structure for disabling the biasing means during playback thereby disposing the signal pickup subject to engagement with the disc record.

2. A system as defined in claim 1 wherein the supporting structure includes translatory motion imparting means for varying the position of the signal pickup in relation to the disc record spiral groove in a manner that opposes deviations of the relative speed from a predetermined speed, wherein the coupler is subject to engagement with the translatory motion imparting means when the pickup arm cartridge is assembled in the supporting structure compartment, wherein the compliant pickup arm support serves to substantially rigidly transmit the translatory motion of the coupler to the pickup arm while permitting the pickup arm arcuate motion, and wherein the suspending means serves to locate said coupler in a position permitting engagement with the translatory motion imparting means upon seating of the pickup arm cartridge in the supporting structure compartment.

3. A system as defined in claim 2 wherein a centering rest depends downwardly from a top wall of said casing, and wherein the biasing means, when not disabled, urges the pickup arm against an inverted V-shaped recess disposed in the centering rest.

4. A pickup arm cartridge for use with a playback system for recovering recorded signals from a disc record by a signal pickup when relative speed is established therebetween, the playback system including a supporting structure having a compartment for receiving the pickup arm cartridge, and the supporting structure including translatory motion imparting means for varying the position of the signal pickup in relation to the disc record in a manner that opposes deviations of the relative speed from a predetermined speed, said pickup arm cartridge comprising:
 1. a signal pickup assembly which comprises:
   A. a pickup arm carrying the signal pickup at one end thereof;
   B. a coupler subject to engagement with the translatory motion imparting means;
   C. a compliant pickup arm support for securing an end of the pickup arm remote from the signal pickup to the coupler, the compliant pickup arm support serving to substantially rigidly transmit any translatory motion of the coupler to the pickup arm while permitting arcuate movement of the pickup arm about the support;
 2. an elongated casing having walls defining a protective enclosure for the signal pickup assembly;
 3. means for suspending the coupler carrying the pickup arm to one end of the elongated casing, said suspending means serving to locate the coupler in a position permitting engagement with the translatory motion imparting means upon seating of the pickup arm cartridge in the supporting structure compartment;
 4. biasing means for securely holding the signal pickup assembly within the casing during storage and handling of the cartridge; and
 5. means for disabling the biasing means during playback to permit protrusion of said signal pickup from said cartridge for engagement with the disc record.

5. A system as defined in claim 4 wherein a centering rest depends downwardly from a top wall of said casing, and wherein the biasing means, when not disabled, urges the pickup arm against an inverted V-shaped recess disposed in the centering rest.

6. A system as defined in claim 5 wherein said suspending means also serves to substantially maintain a predetermined orientation of the pickup in a disc record groove during record playback, while permitting translatory motion of said coupler, and wherein the biasing means is a leaf spring having one end secured to a wall of the elongated casing, and wherein the leaf spring second end is subject to engagement with the pickup arm.

7. A system as defined in claim 6 wherein the leaf spring has an extension which protrudes through an opening in the protective casing for engagement with the disabling means, and wherein the disabling means comprises:

a roller rotatably mounted to the supporting structure adjacent to the leaf spring extension;

a finger subject to engagement with the leaf spring extension and mounted on the roller for effecting movement of said leaf spring between (1) a first position securely holding the pickup arm against the centering rest, and (2) a second position disengaged from the pickup arm so as to permit signal pickup engagement with the disc record;

means for biasing the roller so as to normally dispose the finger in the first position; and means for selectively causing rotation of the roller so as to dispose the finger in the second position.

8. In a playback system for recovering recorded signals from a disc record, said system including a housing subject to radial travel with respect to the disc record during playback operations, the combination comprising:

1. a pickup arm carrying a signal pickup at one end thereof;
2. an elongated casing having walls defining a protective enclosure for said signal pickup and said pickup arm, and said casing having an opening through which said signal pickup may protrude;
3. means for suspending the other end of said pickup arm within said casing, said casing being subject to reception in said housing in a fixed operative position to enable said playback operations;
4. means secured in said casing for releasably retaining said pickup arm in a retracted position within said casing, said retracted position providing a location for said signal pickup withdrawn within the confines of said casing and remote from said opening; and
5. means mounted in said housing for releasing said pickup arm from said retracted position, whereby protrusion of said signal pickup through said opening is no longer prohibited by said retaining means.

9. A combination in accordance with claim 8 wherein a centering rest is secured to a wall of said casing opposed to one of said openings, and wherein said pickup arm engages said centering rest when in said retracted position.

10. Apparatus in accordance with claim 9 wherein operation of said releasing means permits protrusion of said signal pickup through said one opening to effect record engagement.

* * * * *